United States Patent [19]

Brehmer et al.

[11] Patent Number: 4,793,882
[45] Date of Patent: Dec. 27, 1988

[54] PROCESS FOR PRODUCING THREE-DIMENSIONAL STIFFENING ELEMENT OF A MELTABLE PLASTIC POWDER OR A POWDER MIXTURE CONTAINING MELTABLE PLASTIC POWDER AND APPLICATION THEREOF TO A SUBSTRATE, PARTICULARLY SHOE PARTS

[75] Inventors: Harald Brehmer, Neuhofen; Emil Wilding, Birkenheide, both of Fed. Rep. of Germany

[73] Assignee: Giulini Chemie GmbH, Ludwigshafen am Rhein, Fed. Rep. of Germany

[21] Appl. No.: 928,008

[22] Filed: Nov. 7, 1986

[30] Foreign Application Priority Data

Nov. 8, 1985 [DE] Fed. Rep. of Germany ....... 3539573

[51] Int. Cl.⁴ ............................................. A43B 23/17
[52] U.S. Cl. ................................. 156/235; 12/146 D; 264/112; 264/244
[58] Field of Search ...................... 12/146 D, 61 A, 64; 156/230, 231, 235, 238, 240, 249; 264/244, 112, 126, 135

[56] References Cited

U.S. PATENT DOCUMENTS

| | | | |
|---|---|---|---|
| 3,279,969 | 10/1966 | Borchardt | 156/235 |
| 3,294,612 | 12/1966 | Pail et al. | 156/235 |
| 3,388,412 | 6/1968 | Hanson et al. | 12/146 D |
| 3,427,733 | 2/1969 | Beckwith | 36/68 |
| 3,973,285 | 8/1976 | Babson et al. | 12/146 D |
| 4,069,532 | 1/1978 | Rossitto et al. | 12/146 D |
| 4,177,098 | 12/1979 | Gorini et al. | 156/80 |
| 4,352,712 | 10/1982 | Paul | 156/540 |
| 4,383,878 | 5/1983 | Young et al. | 156/235 |
| 4,503,091 | 3/1985 | Elliott et al. | 427/180 |
| 4,528,710 | 7/1985 | Simmonds et al. | 12/146 D |
| 4,540,608 | 9/1985 | Simmonds, Jr. et al. | 427/282 |
| 4,592,798 | 6/1986 | Simmonds, Jr. et al. | 156/578 |
| 4,650,538 | 3/1987 | Simmonds, Jr. et al. | 156/578 |

FOREIGN PATENT DOCUMENTS 519410 5/1977 Australia .
3539573 11/1985 Fed. Rep. of Germany .

Primary Examiner—Jan H. Silbaugh
Assistant Examiner—Mary Lynn Fertig
Attorney, Agent, or Firm—Spencer & Frank

[57] ABSTRACT

The invention relates to a process for producing a three-dimensional stiffening element from a powder selected from the group consisting of a meltable plastic powder and a powder mixture comprising the meltable plastic powder comprising applying the powder to an auxiliary carrier in a template screen printing process with the aid of a template and subsequently transferring the thus obtained stiffening element to a substrate, the improvement comprising subsequent to the step of applying to the auxiliary carrier, compressing and sintering the powder with a hot molding plug to obtain a blank; lifting the plug while removing the blank from the auxiliary carrier and further melting the sintered plastic particles of the blank which are in contact with the molding plug; and said step of transferring comprising transferring the further melted blank onto the substrate disposed therebelow while lowering the molding plug.

12 Claims, 1 Drawing Sheet

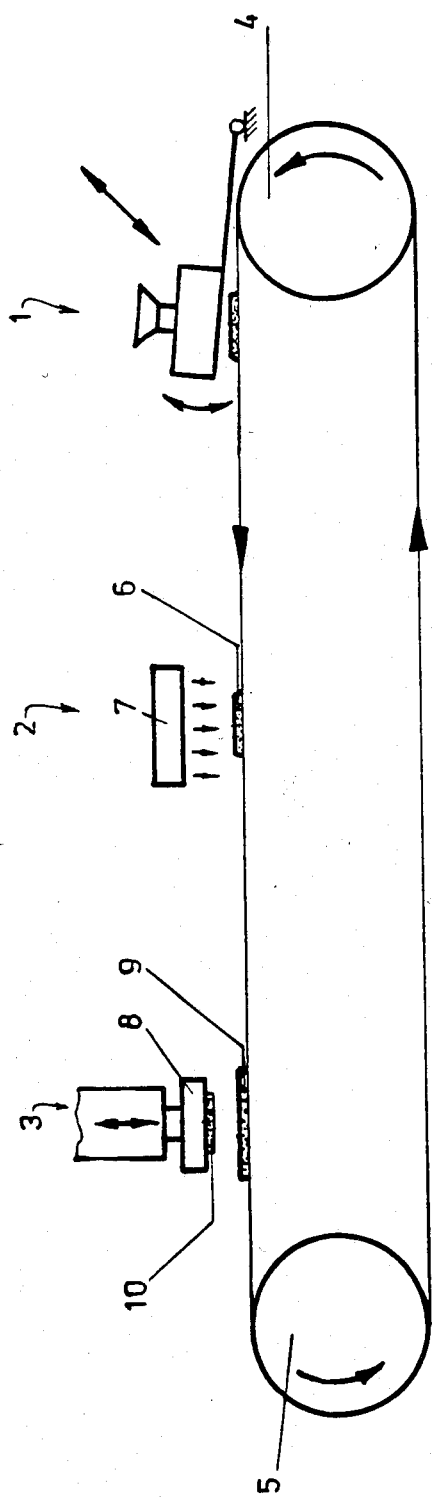
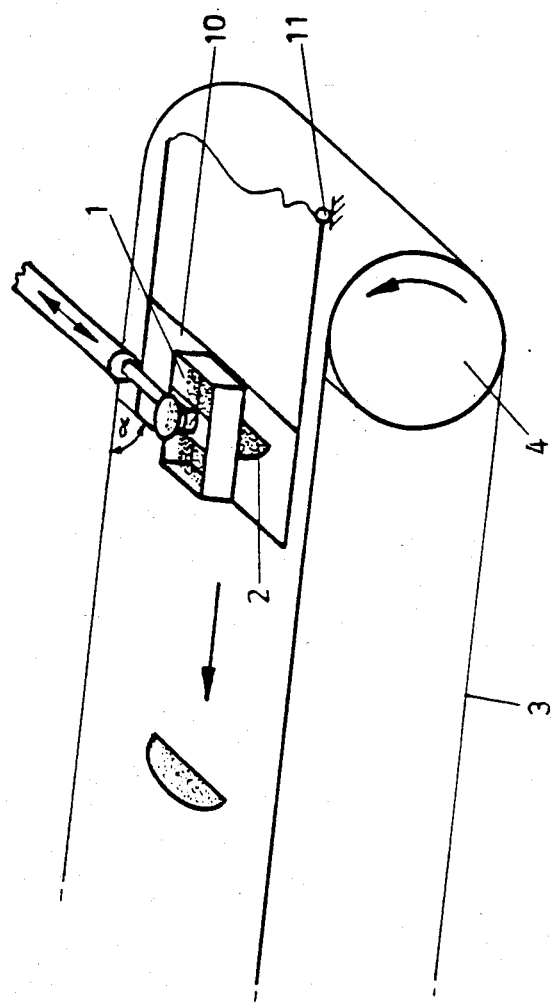
Figure 1
Figure 2

PROCESS FOR PRODUCING THREE-DIMENSIONAL STIFFENING ELEMENT OF A MELTABLE PLASTIC POWDER OR A POWDER MIXTURE CONTAINING MELTABLE PLASTIC POWDER AND APPLICATION THEREOF TO A SUBSTRATE, PARTICULARLY SHOE PARTS

BACKGROUND OF THE INVENTION

1. Field of the Invention

The present invention relates to a process for producing three-dimensional stiffening elements of a meltable plastic powder or a powder mixture comprising the meltable plastic powder in a template screen printing process and connecting the element to a substrate, particularly shoe parts, and to an apparatus for implementing the process.

2. Description of the Background

The use of thermoplastic stiffening materials in the shoe, clothing and leather accessory industries has been known for a long time. In most cases, the stiffening material is manufactured in sheet form and is used as pieces cut therefrom according to a pattern. This is done in the shoe industry, e.g., to stiffen the region of the heel, and possibly also the region of the toe.

The cut pieces also called stiffening elements or components are cut out of the sheet material by means of a cutting tool and made thinner by a skiving-process at least at the side which is not going to be folded under the "last". The cut pieces are moldable with the aid of heat, and once shaped and cooled, they should display good flexibility and shape retention.

The activation and fixation of the stiffening elements on the leather upper is effected as a function of the characteristics of the thermoplastic material either under heat or with the aid of a solvent. For toe reinforcements, a hot-melt adhesive is often spread onto one or both sides of the stiffening elements which are then pressed on the upper part of the shoe to be reinforced by means of a hot molding plug.

It is known that sheets of thermoplastic stiffening material can be manufactured in various ways, such as, for example, by coating or impregnating woven or knit or non-woven textile structures with dispersions, solutions or melted thermoplastic synthetics. According to U.S. Pat. No. 3,427,733, the sheets may also be produced by extrusion of thermoplastic synthetics or by extrusion coating of textile sheets.

DE-OS No. 2,621,195.A1 disclosed other stiffening materials and stiffening elements which are produced by melting powder mixtures of plastics, fillers and possibly other auxiliary substances onto textile substrates. It is also possible to produce molded elements withou substrate materials from these powder mixtures.

U.S. Pat. No. 3,973,285 disclosed applying stiffening material in the molten state to the upper portion of a shoe which is clamped in and held along its edges. According to this reference, the process stages of "producing the sheet material", "coating with melt adhesive", "cutting," "skiving" and "hot pressing" can be dispensed with.

The above process is used in practice for the manufacture of inexpensive shoes due to the low viscosity of the stiffening material at 190° C. it has, however, a number of drawbacks such as cracking (degrading) which appears in the melt during production down times for formation of fibers, poor adhesion, and the like.

Thus, the person skilled in the art continues to operate within very close limits on the basis of various extremely critical process parameters. Applicable substances are usually not employed in practice because it is not economical.

Furthermore, DE-OS No. 2,159,226 disclosed a process in which the molten siffening material is initially poured into a mold in the first station of a machine so as to form a desired element. Then the mold is brought to the second station, in which the uncooled and still sticky part of the element is glued under pressure to the shoe upper to be stiffened. This process also lacks in ease of operation and still has considerable drawbacks.

According to DE No. 3,347,237.A1, the disadvantages of the prior art are to be overcome with a machine in which stiffening elements of a predetermined shape are produced from a meltable plastic powder instead of the molten plastics used in the past. As in the process according to DE No. 2,621,195.A1, the machine operates with three process stages; namely applying the powder in a certain shape, heating until the material melts and cooling under pressure. According to the prior art reference, the meltable powder is applied in the form of a desired stiffening element onto a receiving belt or auxiliary carrier in a screen printing process. It is then melted in a heat station of the machine, glued to the cut shoe upper to be stiffened in a press station and cooled under pressure. This is attained while keeping and receiving side of the substrate to be reinforced facing downward. This is a significant drawback.

Problems arise often during the operation of this machine for the manufacture of stiffening elements due to the difficulties observed after application of the powder, the high melting temperatures, the long periods of dwelling in the heating station and difficulties in positioning the stiffening element when it is transferred from the receiving belt or auxiliary carrier to the shoe upper to be stiffened. Up to the present time no satisfactory solution to these problems had been found. The high melting temperatures for the plastic powder (191° to 260°) require, for example, heating times up to about 25 seconds and more.

Processes for orienting the substrates to be reinforced during their residence time in the above machines are disclosed in DE No. 3,444,365.A1. However, construction costs for transferring the molten reinforcement material from the auxiliary carrier to the receiving side of the upper piece of the shoe to be reinforced are considerable and in many cases not economically justifiable.

SUMMARY OF THE INVENTION

It is therefore an object of the present invention to provide a novel process for producing a three-dimensional stiffening element made of a meltable plastic powder or a powder mixture containing the meltable plastic powder, its application to an auxiliary carrier in a template screen printing process and subsequent transfer of the resulting stiffening element to a substrate to be stiffened, particularly to parts of a shoe upper. It is also an object of the present invention to provide an apparatus for implementing the inventive process.

Surprisingly, the above described difficulties can be substantially overcome with the novel process and apparatus.

The novel process comprises applying a meltable plastic powder or a powder mixture containing a meltable plastic powder to an auxiliary carrier by means of a template, compressing and sintering the powdered carrier with a hot molding plug to obtain a blank, lifting the thus resulting blank from the auxiliary carrier while raising the molding plug and melting the sintered plastic particles during contact thereof, and transferring the further melted blank to a receiving substrate disposed below the molding plug while lowering the molding plug.

In particular embodiments of the invention, the receiving substrate may be a substrate to be stiffened such as parts of a shoe upper or an auxiliary substrate.

The apparatus of the invention for producing a three-dimensional stiffening element from a powder selected from the group consisting of a meltable plastic powder or a powder mixture comprising the meltable powder, comprising an auxiliary carrier;
a template;
means for applying a powder to the auxiliary carrier with the template; and
means for pressing the powder; said pressing means having a heated molding plug for producing a stiffening element and being capable of transferring the stiffening element to a substrate.

A more complete appreciation of the invention and many of the attendant advantages thereof will be readily perceived as the same becomes better understood by reference to the following detailed description when considered in connection with the accompanying figures.

BRIEF DESCRIPTION OF THE DRAWINGS

FIG. 1 is a side view of the apparatus of the invention.

FIG. 2 is a top view of the powder application means.

DESCRIPTION OF THE INVENTION

The novel process is a dual transfer process. It is based on the realization that such a process can be employed with success provided that the following occur:

(a) The adhesion forces of the partially melted sintered stiffening element to the surface of the molding plug is greater than its adhesion forces to the auxiliary carrier, when the hot molding plug is raised, and the cohesive forces amongst the sintered powder particles are greater than the adhesive forces of the element to the auxiliary carrier and to the surface of the molding plug.

(b) The adhesion forces of the element to the surface of the molding plug are greater than the force exercised by gravity on the mass of the stiffening element and the force exercised by gravity on the mass of the stiffening element is smaller than the cohesion forces in the melt during its period of attachment to the molding plug.

(c) When the molten stiffening element is transferred to the substrate to be reinforced or to the auxiliary substrate the adhesion forces of the melt to the latter two are greater than to the surface of the molding plug, and the cohesion forces within the molten stiffening element are greater than its adhesion forces to the surface of the molding plug.

The dual transfer process can be implemented in a particularly advantageous manner if the force exercised by gravity on the mass of the substrate to be reinforced (receiving substrate) and the stiffening element is greater than the adhesion forces of the molten stiffening member to the surface of the molding plug. In such an embodiment, it is not necessary to mount the receiving substrate on a support.

The primary advantage of the invention is that the double transfer of the stiffening element makes the process and the operation of the apparatus for implementing the process thereof more reliable and considerably simpler. In the dual transfer process of the invention, the substrate to be reinforced or shoe part always rests on a stable support so that the stiffening element to be transferred is pressed onto it from the top and not from the bottom. The steps of positioning the substrate and melting the stiffening element onto the substrate have thus been rendered extremely simple.

According to the invention, the molten stiffening element can also be initially transferred in the second transfer stage to an auxiliary substrate (e.g. paper) from which the element can be easily removed once it has cooled. Siffening members produced in this manner after having been appropriately activated can then be applied separately to receiving substrates, e.g., by hot pressing or gluing with the aid of adhesives or solvents.

Particularly suitable auxiliary carriers for the first transfer stage are sheets or plates which may be made of silicone rubber. The auxiliary carriers may also be concave below the template, i.e., may be provided with recesses so that curved stiffening elements are produced. Auxiliary carriers having different shapes, e.g., hollowed in the form of a wedge, can also be used. The process is thus not limited to planar auxiliary carriers.

Suitable auxiliary substrates for the second transfer stage for transferring the hot stiffening material from the molding plug are sheets as well as plates. Suitable are, for example, sheets or plates made of PVC or PUR transfer coating paper, aluminum, polyester (e.g. Mylar ®) or polyethylene terephthalate (e.g. Hostaphan ®).

The contact side of the molding plug is preferably provided with a coating of polytetrafluoroethylene (Teflon ®). This invention, however, is not limited to this embodiment.

Another aspect of the present invention is a process in which the three-dimensional stiffening elements are fixed to a textile substrate which may be woven, knitted or non-woven. Advantageously, this is attained by placing the cut textile pieces onto the powdered shaped stiffening elements, which may possibly have been sintered on their surface. During the steps of pressing and transferring to the molding plug, the cut textile piece, which must have an open structure having pores, perforations, or the like, bonds itself to the stiffening element. No adverse influence by the textile piece on the subsequent process stages has been observed.

During the assembly of the shoe wherein the stiffening element is again plastified by heating, the presence of the textile substrate avoids the stretching and thinning of the stiffening member by developing tensile forces. The substrate thus acts as an expansion inhibitor and additionally strengthens the stiffening material.

According to another embodiment of the invention, the molten stiffening element may also be firmly bonded to a textile substrate in the second transfer stage. This can be attained by pressing the textile piece onto the stiffening element and fixing thereto in an additional process step or work cycle after transferring the stiffening element to the substrate to be stiffened or to the auxiliary substrate. The textile piece may here also be the shoe lining.

According to a particularly simple embodiment of the invention, the template required for the application of the powder is produced by means of a cutting tool. Cutting tools are available to the manfacturer of stiffening elements or shoe factories in many different shapes. The desired stiffening shape is cutted out of the template material for example from a glass fiber reinforced polypropylene plate, with a matching cutting tool. The cross section of the plate will be suitable for the intended purpose. It may be constant, wedge-shaped or have some other shape. Due to flowing action during the pressing process, it still is advisable to select the size of the template pattern to be somewhat smaller than the size of the desired finished product. It has been found that in many cases it is sufficient to select the size of the cut piece about 1 to 2 mm smaller than the finished product.

In configuring the dual transfer process according to the invention, it may further be of advantage that the powder to be applied in a template screen printing process be initially heated. This can be attained before compression and sinering to the extent that the surface of the applied powder solidifies somewhat, i.e., sinters, slightly or begins to melt. In this manner, the otherwise observed formation of a whirl in the powder layer due to the fast approach the hot molding plug is eliminated and the processing time and the processing cycle are therefore shortened.

A suitable flowable plastic powder mixture is for example the mixture of meltable plastic powder and powdered filler disclosed in DE No. 2,621,195.A1. The powdered filler has a grain size distribution comparable to the grain size distribution of the plastic powder ranging from 50 micron to 600 micron, particularly from 100 micron to 400 micron. However, according to the invention, the plastic powder may also be used without a filler or in admixture with other plastic particles.

The "other" plastic particles used in the last-mentioned embodiment are polymers which melt at a higher temperature range and thus in their undissolved state act as a filler. Suitable mixtures are for example mixtures of a high density and a low density polyethylene or those of an ethylene vinyl acetate copolymer and a polyethylene. Suitable low melting point plastics are also polycaprolactone and ionomeric resins.

Wood meal, cork meal, chalk, talcum, silica and other organic and inorganic substances can also be used as fillers. These fillers can be used in amounts of up to 100 volume percent with respect to the volume of the plastic powder.

According to a further embodiment of the invention, the three-dimensional stiffening element may also be composed of several layers. For this purpose, identical or different meltable layers are successively pressed on.

The dual transfer process may be performed in a stationary as well as continuous manner. In the latter mode, the process may take place on an assembly line which is composed for example of an endless conveyor belt or auxiliary carrier subdivided into at least two work stations. The one work station is equipped with a powder applying device and the other station with a pressing device.

According to one feature of the invention, the continuous assembly line may also be composed for example of two endless conveyor belts (auxiliary carrier resp, auxiliary substrate) between which moves a heated roller. The heated roller takes the applied powder from the auxiliary carrier and transfers it after melting to the auxiliary substrate.

Other objects, advantages and features of the present invention will become apparent to those skilled in the art from the following discussion.

DESCRIPTION OF THE PREFERRED EMBODIMENTS

In FIG. 1, the powder applying device 1 applies the plastic powder through the defined cutout in template 2 onto an auxiliary carrier or conveyor belt 3. The endless conveyor belt 3 is driven by a roller 4 and is reversed back to the first work station by reversal roller 5. Template 2 in the illustrated embodiment is a glass fiber reinforced polypropylene plate having a thickness of 1.5 mm. Into this plate, the desired shape of the stiffening element has been cutted by means of a cutting tool. The template can be placed onto the conveyor belt. The template is fixed to the powder applying device 1 and can be removed from the conveyor belt after the powder has been applied at 6.

In the illustrated embodiment, the powder discharging device 1 is a box, open on top and bottom and acting as powder container as well as doctor blade, made of a high grade sheet steel. The device 1 is at least wide enough to traverse the entire width of the template cutout while filling the cavity with plastic powder. It can additionally be guided in guide rails at both sides. The guide rails 10 in FIG. 2 extend transversely to the direction of movement of the conveyor belt with the angle $\alpha$ enclosed by the rail and the direction of movement being 10° to 170°, more particularly 85° to 95°.

The box is guided at its sides and top in guide rails extending transversely to the direction of movement of the conveyor belt. The box filled with plastic powder is placed once per printing cycle over the cutout in the template with a pneumatic cylinder serving as the drive. After the cavity formed by the conveyor belt and the template cutout have been filled with plastic powder, the template is lifted off and the applied powder is moved to the second work station. Then the pressure is reduced and the box is moved back to make another application of powder on the conveyor belt.

In the illustrated embodiment, the box 1 guided in rails and template 2 can be lifted away from the belt on one side and mounted in a fulcrum which lies somewhat behind a roller 4.

When the applied powder 6 is disposed in the second work station, it is preheated by a heat radiator 7 which may be any desired heat source. The heating is conducted so that at least the particles at the surface adhere to one another or sinter together. Any intense movement of air must be avoided at this point.

During the next "printing cycle", the applied powder 6 moves to the third work station and is compressed there by the heated molding plug 8. After the plastic particles have sintered together and melted onto stamp 8, the powder is removed from the conveyor belt. The melting process continues during the dwelling period at molding plug 8, particularly at the upper dead center. This produces a desired reduction in viscosity. The shoe part 9 to be stiffened is then disposed below molding plug 8. During a further pressing process, the shoe part 9 receives the stiffening element 6 from the molding plug. After lifting away the molding plug, the stiffened shoe member is either glued to the shoe lining in a new pressing cycle or is subjected to further processing after it is released from the conveyor belt. The cutout in the template should generally be selected to be somewhat smaller than the desired size of the finished product since the pressing and flowing of the plastic powder makes an increase in size unavoidable.

In FIG. 2, the numeral 1 identifies the box, the numeral 2 identifies the template, and the numerals 10 the guide rails and 11 the fulcrum of the powder application device. The numeral 4 identifies the guide roller and the numeral 3 the conveyor belt.

The subject matter of the invention is of course not limited to the embodiment illustrated in the drawings. The process according to the invention can also be implemented with an apparatus according to a different design concept.

The invention now being fully described, it will be apparent to one of ordinary skill in the art that many changes and modifications can be made thereto without departing from the spirit or scope of the invention as set forth herein.

The present disclosure relates to the subject mater disclosed in German Patent, Ser. No. P 35 39 573.7 filed Nov. 8, 1985, the entire specification of which is incorporated herein by reference.

What is claimed is:

1. A process for producing a three-dimensional stiffening element from at least one meltable plastic powder comprising:

applying the powder with the aid of a template to an auxiliary carrier;

compressing and sintering the powder on the auxiliary carrier with a hot molding plug to obtain a blank;

lifting the molding plug with the blank held thereon due to greater adhesion of the blank to the molding plug than to the auxiliary carrier, thereby removing the blank from the auxiliary carrier, and further melting the sintered plastic particles of the blank which are in contact with the molding plug;

disposing a substrate below the blank held on the molding plug; and transferring the further melted blank onto the substrate disposed therebelow by lowering the further melted blank, held on the molding plug, into contact with the substrate and removing the molding plug, leaving the further melted blank adhered on the substrate due to greater adhesion of the further melted blank to the substrate than to the molding plug, the transferred further melted blank forming a three-dimensional stiffening element.

2. The process as of claim 1, wherein the substrate is a shoe upper.

3. The process of claim 1, wherein the substrate is an auxiliary substrate.

4. The process of claim 3, wherein the auxiliary substrate is a removable paper.

5. The process of claim 3, wherein the auxiliary substrate is made of or has the surfaces thereof made of aluminum, polyester terephthalate or polyethylene terephatalate.

6. The process of claim 1, wherein the other auxiliary carrier is made of or has the surface thereof made of silicone rubber.

7. The process of claim 1, wherein the auxiliary carrier has a recess.

8. The process of claim 1, wherein the molding plug is coated with polytetrafluoroethylene.

9. The process of claim 1, further comprising subsequent to applying the powder to the auxiliary carrier, laying onto the powder a pre-cut textile with openings.

10. The process of claim 1, wherein the templae used to apply the powder to the auxiliary carrier has a wedge-shaped cross-section.

11. The process of claim 1, wherein the powder further comprises a powdered filler.

12. The process of claim 11, wherein the powdered filler and the meltable plastic powder have a grain size between about 50 micron and 600 micron.

* * * * *